United States Patent
Pang et al.

(10) Patent No.: US 10,645,003 B2
(45) Date of Patent: *May 5, 2020

(54) DATA PACKET TRANSMISSION METHOD, NETWORK SIDE DEVICE, AND USER EQUIPMENT

(71) Applicant: HUAWEI TECHNOLOGIES CO., LTD., Shenzhen, Guangdong (CN)

(72) Inventors: Lingli Pang, Shanghai (CN); Xiaoxiao Zheng, Shanghai (CN); Min Huang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/106,325

(22) Filed: Aug. 21, 2018

(65) Prior Publication Data

US 2018/0359183 A1    Dec. 13, 2018

Related U.S. Application Data

(63) Continuation of application No. PCT/CN2016/074258, filed on Feb. 22, 2016.

(51) Int. Cl.
*H04L 12/747* (2013.01)
*H04L 29/06* (2006.01)
(Continued)

(52) U.S. Cl.
CPC ............ *H04L 45/742* (2013.01); *H04L 29/06* (2013.01); *H04L 47/36* (2013.01); *H04L 67/02* (2013.01);
(Continued)

(58) Field of Classification Search
CPC ... H04L 45/742; H04L 47/36; H04L 67/2847; H04L 67/2842; H04L 67/02; H04L 29/06
See application file for complete search history.

(56) References Cited

U.S. PATENT DOCUMENTS

2007/0089110 A1*   4/2007   Li .................... H04L 67/2847
                                                              717/178
2010/0005153 A1    1/2010   Tsao
(Continued)

FOREIGN PATENT DOCUMENTS

CN         101262413 A    9/2008
CN         102185881 A    9/2011
(Continued)

OTHER PUBLICATIONS

International Search Report, dated Nov. 18, 2016, in International Application No. PCT/XN2016/074258 (4 pp.).
(Continued)

*Primary Examiner* — Afshawn M Towfighi
(74) *Attorney, Agent, or Firm* — Kilpatrick Townsend & Stockton LLP

(57) ABSTRACT

Embodiments of the present disclosure disclose a data packet transmission method, including: receiving, by a network device, a first request message sent by user equipment, where the first request message is used to request the network device to allocate data cache space; caching, by the network device in the data cache space, at least a part of a data packet sent by a server device to the user equipment; receiving, by the network device, a second request message sent by the user equipment, where the second request message is used to request the network device to send the cached data packet; and sending, by the network device, a part or all of the cached data packet to the user equipment. Therefore, a data packet can be cached on a network side, so as to resolve a problem that data packet transmission in a data transmission process is not timely.

14 Claims, 6 Drawing Sheets

(51) Int. Cl.
    *H04L 29/08*    (2006.01)
    *H04L 12/805*    (2013.01)
(52) U.S. Cl.
    CPC ...... *H04L 67/2842* (2013.01); *H04L 67/2847* (2013.01)

(56) References Cited

U.S. PATENT DOCUMENTS

| | | | |
|---|---|---|---|
| 2011/0299410 A1 | 12/2011 | Diab et al. | |
| 2011/0302324 A1* | 12/2011 | Karaoguz | G06Q 20/10 709/246 |
| 2012/0124184 A1 | 5/2012 | Sakata et al. | |
| 2013/0219006 A1 | 8/2013 | Kuo | |

FOREIGN PATENT DOCUMENTS

| | | |
|---|---|---|
| CN | 102196506 A | 9/2011 |
| CN | 102595512 A | 7/2012 |
| CN | 104115140 A | 10/2014 |
| CN | 104283800 A | 1/2015 |

OTHER PUBLICATIONS

Extended European Search Report, dated Jan. 4, 2019, in European Application No. 16890945.5 (12 pp.).
International Search Report, dated Nov. 18, 2016, in International Application No. PCT/CN2016/074258 (4 pp.).
Written Opinion of the International Searching Authority, dated Nov. 18, 2016, in International Application No. PCT/CN2016/074258 (8 pp.).

* cited by examiner

DATA PACKET TRANSMISSION METHOD, NETWORK SIDE DEVICE, AND USER EQUIPMENT

CROSS-REFERENCE TO RELATED APPLICATIONS

This application is a continuation of International Application No. PCT/CN2016/074258, filed on Feb. 22, 2016, the disclosure of which is hereby incorporated by reference in its entirety.

TECHNICAL FIELD

The present disclosure relates to the field of communications technologies, and in particular, to a data packet transmission method, a network device, and user equipment.

BACKGROUND

For some video services, cache space is disposed in a player of a terminal to store to-be-played data. When an amount of data in the cache space is relatively small, the terminal applies to a server for new data and continuously puts the new data into the cache space to wait for play. Video play continuity can be ensured by pre-storing data in the cache space, and play interruption caused by a reason such as poor network quality can be avoided to some extent.

However, because a capacity of the cache space is limited, in a data transmission process, it may be inevitable that a terminal cannot obtain new data from a server in a timely manner due to a problem in a network transmission status, terminal signal quality, or the like, thereby causing play interruption and affecting user experience of viewing.

SUMMARY

Embodiments of the present disclosure provide a data packet transmission method, a network device, and user equipment, to implement caching of a data packet on a network side, so as to resolve a problem that data packet transmission in a data transmission process is not timely.

A first aspect of the embodiments of the present disclosure provides a data packet transmission method, including: receiving, by a network device, a first request message sent by user equipment, where the first request message is used to request the network device to allocate data cache space; caching, by the network device in the data cache space, at least a part of a data packet sent by a server device to the user equipment; receiving, by the network device, a second request message sent by the user equipment, where the second request message is used to request the network device to send the cached data packet; and sending, by the network device, a part or all of the cached data packet to the user equipment.

In a first possible implementation of the first aspect, the first request message sent by the user equipment includes a capacity of the data cache space requested by the user equipment. Correspondingly, after receiving the first request message sent by the user equipment, the network device determines, based on the capacity of the data cache space requested by the first request message, to allocate the data cache space with a corresponding capacity to the user equipment.

With reference to the first aspect and the first possible implementation of the first aspect, in a second possible implementation, the first request message sent by the user equipment further includes data packet identification information, and the data packet identification information is used to identify the to-be-cached data packet requested by the user equipment. Correspondingly, a specific operation that the network device caches, in the data cache space, at least a part of the data packet sent by the server device to the user equipment is: receiving the data packet sent by the server device to the user equipment; and caching the data packet in the data cache space if identification information included in the received data packet is the same as the data packet identification information included in the first request message.

In a third possible implementation of the first aspect, the first request message sent by the user equipment includes a service indication and an indication that the user equipment supports caching a data packet on the network device. Correspondingly, after receiving the first request message sent by the user equipment, the network device further performs the following operation: allocating, by the network device, the data cache space to the user equipment based on the service indication and the indication that the user equipment supports caching a data packet on the network device.

With reference to the third possible implementation of the first aspect, in a fourth possible implementation, after allocating the data cache space to the user equipment based on the service indication and the indication that the user equipment supports caching a data packet on the network device, the network device further performs the following operation: sending a first response message to the user equipment, where the first response message is used to notify that the network device has allocated the data cache space.

With reference to the third or the fourth possible implementation of the first aspect, in a fifth possible implementation, the service indication further includes data packet identification information, and the data packet identification information is used to identify the to-be-cached data packet requested by the user equipment. Correspondingly, a specific operation that the network device caches, in the data cache space, at least a part of the data packet sent by the server device to the user equipment is: receiving the data packet sent by the server device to the user equipment; and caching the data packet if identification information included in the received data packet is the same as the data packet identification information included in the service indication.

With reference to any one of the first aspect or the first to the fifth possible implementations of the first aspect, in a sixth possible implementation, the second request message includes at least one of the following information: size information of the data packet requested by the user equipment; identification information of the data packet requested by the user equipment; or a storage location of the data packet requested by the user equipment.

With reference to any one of the first aspect or the first to the sixth possible implementations of the first aspect, in a seventh possible implementation, the second request message is a radio resource control (RRC) message or a hypertext transfer protocol (HTTP) request.

A second aspect of the embodiments of the present disclosure provides a data packet transmission method, including: sending, by user equipment, a first request message to a network device, where the first request message is used to request data cache space from the network device; sending, by the user equipment, a third request message to a server device, where the third request message is used to request the server device to send a data packet, and the network device caches, in the data cache space, at least a part of the data packet sent by the server device; sending, by the user equipment, a second request message to the network device, where the second request message is used to request the network device to send the cached data packet; and receiving, by the user equipment, a part or all of the cached data packet sent by the network device.

In a first possible implementation of the second aspect, the first request message sent by the user equipment further includes data packet identification information, and the data packet identification information is used to identify the to-be-cached data packet requested by the user equipment.

With reference to the second aspect and the first possible implementation of the second aspect, in a second possible implementation, the first request message sent by the user equipment includes a service indication and an indication that the user equipment supports caching a data packet on the network device.

In a third possible implementation of the second aspect, after sending the first request message to the network device, the user equipment further performs the following operation: receiving a first response message sent by the network device, where the first response message is used to notify that the network device has allocated the data cache space.

With reference to the third possible implementation of the second aspect, in a fourth possible implementation, after allocating the data cache space to the user equipment based on the service indication and the indication that the user equipment supports caching a data packet on the network device, the network device further performs the following operation: sending a first response message to the user equipment, where the first response message is used to notify that the network device has allocated the data cache space.

With reference to the third or the fourth possible implementation of the second aspect, in a fifth possible implementation, the service indication further includes data packet identification information, and the data packet identification information is used to identify the to-be-cached data packet requested by the user equipment.

With reference to any one of the second aspect or the first to the fifth possible implementations of the second aspect, in a sixth possible implementation, the second request message includes at least one of the following information: size information of the data packet requested by the user equipment; identification information of the data packet requested by the user equipment; or a storage location of the data packet requested by the user equipment.

With reference to any one of the second aspect or the first to the sixth possible implementations of the second aspect, in a seventh possible implementation, the second request message is a radio resource control (RRC) message or a hypertext transfer protocol (HTTP) request.

A third aspect of the embodiments of the present disclosure provides a network device. The network device has a function for implementing behavior in the method provided in the first aspect. The function may be implemented by using hardware, or may be implemented by hardware executing corresponding software. The hardware or the software includes one or more modules corresponding to the foregoing functions.

A fourth aspect of the embodiments of the present disclosure provides user equipment. The user equipment has a function for implementing behavior in the method provided in the second aspect. The function may be implemented by using hardware, or may be implemented by hardware executing corresponding software. The hardware or the software includes one or more modules corresponding to the foregoing functions.

A fifth aspect of the embodiments of the present disclosure provides a network device, including a wireless interface, a modem, a memory, and a processor. The memory stores a group of programs. The processor is configured to invoke the programs stored in the memory to perform the following operations: receiving a first request message sent by user equipment, where the first request message is used to request the network device to allocate data cache space; caching, in the data cache space, at least a part of a data packet sent by a server device to the user equipment; receiving a second request message sent by the user equipment, where the second request message is used to request the network device to send the cached data packet; and sending a part or all of the cached data packet to the user equipment.

A sixth aspect of the embodiments of the present disclosure provides user equipment, including a wireless interface, a modem, a memory, and a processor. The memory stores a group of programs. The processor is configured to invoke the programs stored in the memory to perform the following operations: sending a first request message to a network device, where the first request message is used to request data cache space from the network device; sending a third request message to a server device, where the third request message is used to request the server device to send a data packet, and the network device caches, in the data cache space, at least a part of the data packet sent by the server device; sending a second request message to the network device, where the second request message is used to request the network device to send the cached data packet; and receiving a part or all of the cached data packet sent by the network device.

A seventh aspect of the embodiments of the present disclosure provides a communications system. The communications system includes the network device described in the third aspect and the user equipment and the server device described in the fourth aspect.

It can be learned from above that in the embodiments of the present disclosure, the user equipment requests the data cache space from the network device by sending the first request message; the network device caches, in the data cache space, at least a part of the data packet sent by the server device to the user equipment; the user equipment requests the cached data packet from the network device by sending the second request message; and the network device sends a part or all of the cached data packet to the user equipment. Therefore, the network device can cache the data packet for the user equipment based on the request of the user equipment, so as to resolve a problem that data packet transmission in a data transmission process is not timely.

BRIEF DESCRIPTION OF DRAWINGS

To describe the embodiments of the present disclosure more clearly, the following briefly describes the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

The technical solutions in the embodiments of the present disclosure may be applied to various communications systems, such as: global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, Universal Mobile Telecommunications System (UMTS), and a worldwide interoperability for microwave access (WiMAX) communications system.

Figure 1:
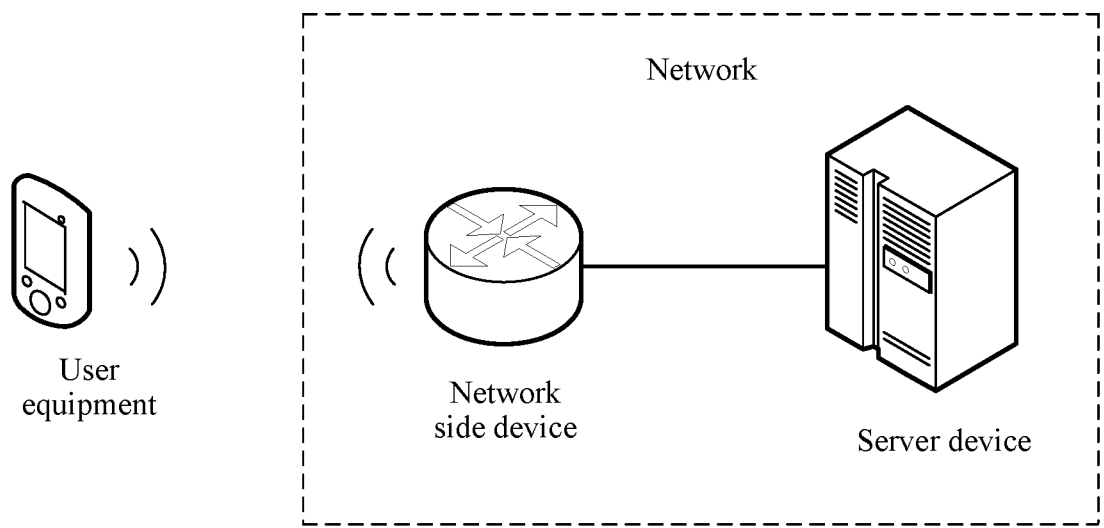
FIG. 1 is a schematic diagram of a scenario of a wireless communications system according to an embodiment of the present disclosure.

Referring to FIG. 1, FIG. 1 is a schematic diagram of a scenario of a wireless communications system according to an embodiment of the present disclosure. As shown in FIG. 1, the wireless communications system includes user equipment (UE), a network device (NW), and a server (SV). The user equipment may communicate with one or more core networks by using a radio access network (RAN). For example, the user equipment may be a mobile phone (or referred to as a "cellular" phone) or a computer having a mobile terminal function. For another example, the user equipment may be a portable, pocket-sized, handheld, computer built-in, or in-vehicle mobile apparatus. The network device includes a radio access network device, a core network device, or a device that combines a radio access network device and a core network device. Alternatively, the network device may include any relay device in a service data packet transfer process. In addition, the network device may be an external device of the foregoing various devices (the radio access network device, the core network device, the device that combines a radio access network device and a core network device, or the relay device), and the external device may send a stored data packet to the foregoing various devices. In the present disclosure, a control plane function entity on the network device may negotiate data cache space, and a user plane function entity provides the data cache space. The server device is configured to respond to a service request and perform processing, for example, send a data packet.

Figure 2:
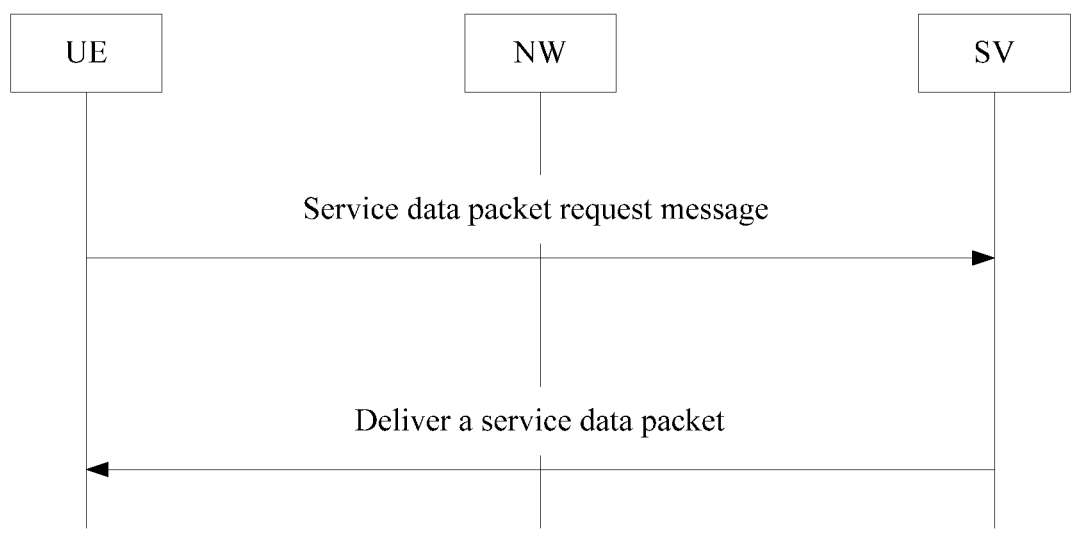
FIG. 2 is a schematic diagram of a data packet transmission process in the prior art.

Referring to FIG. 2, FIG. 2 shows a process in which UE and an SV perform data packet transmission in the prior art. An NW is responsible for scheduling a data packet in the process, to be specific, responsible for transferring, to the SV, a data packet request message sent by the UE, or transferring, to the UE, a data packet delivered by the SV.

In this embodiment of the present disclosure, the NW caches the data packet mainly to ensure service continuity of the UE. The UE is mainly configured to request the cached data packet. It should be noted that in an optional implementation, some functions of the UE and the NW may be exchanged, to be specific, the UE is mainly configured to cache the data packet, and the NW is mainly configured to request the cached data packet. This implementation is not separately described below.

Figure 3:
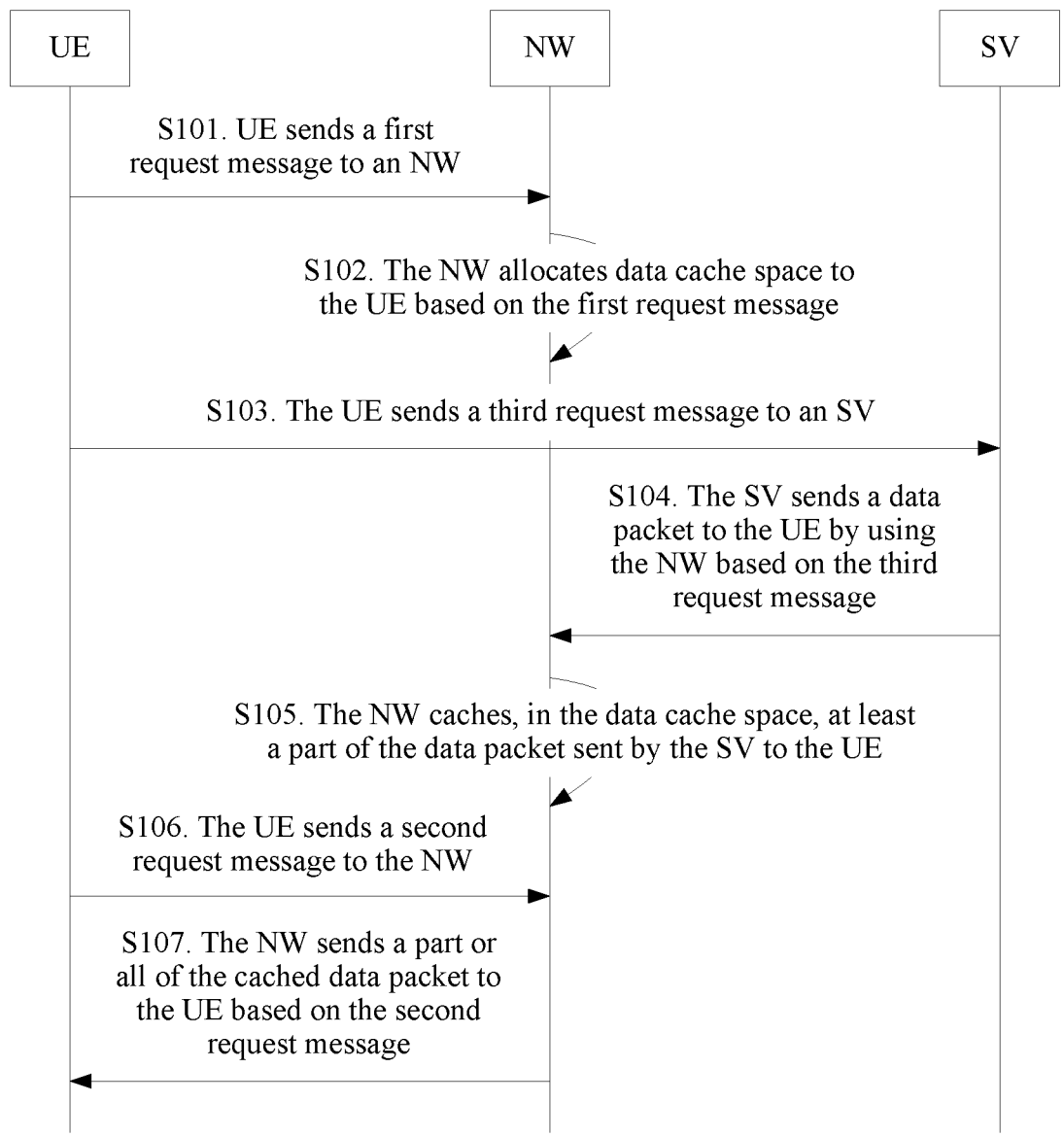
FIG. 3 is a schematic flowchart of a data packet transmission method according to an embodiment of the present disclosure.

FIG. 3 is a schematic flowchart of a data packet transmission method according to an embodiment of the present disclosure. As shown in FIG. 3, a process of the data packet transmission method in this embodiment may be described as follows:

S101. UE sends a first request message to an NW.

Specifically, the UE sends the first request message to the NW, and the NW receives the first request message. The first request message is used to request the NW to allocate data cache space. It should be noted that a trigger occasion when the UE sends the first request message to the NW may be determined based on factors such as a service type of the UE, network load, channel quality, a current data processing rate, total data that needs to be processed, and a local cache space size. For example, if the UE is playing a video and detects that network load is greater than a preset threshold and/or channel quality is lower than a preset indicator, the UE may predict that video freeze may occur during video play, and send the first request message to the NW.

Optionally, the first request message may include a capacity of the to-be-allocated data cache space requested by the UE. It should be noted that the capacity of the to-be-allocated data cache space requested by the UE may also be comprehensively estimated based on factors such as network load, channel quality, a current data processing rate, total data that needs to be processed, and a local remaining cache space size. For example, if the UE is playing a high-definition video, a relatively large amount of data needs to be processed per unit of time (in other words, a data processing rate is relatively large), and a relatively large amount of data needs to be processed in total, the UE may request to allocate data cache space with a relatively large capacity.

Optionally, the first request message may include data packet identification information, and the data packet identification information is used to identify a to-be-cached data packet requested by the UE. This is because the UE may not need to cache all to-be-received data packets in the data cache space, but only needs to cache a part of the to-be-received data packets in the data cache space. The data packet identification information may be a service bearer identifier of the data packet, or may be service address information of the data packet, such as an internet protocol (IP) address, or certainly may be other information that can identify the data packet. This is not enumerated herein.

S102. The NW allocates data cache space to the UE based on the first request message.

Specifically, the NW allocates the data cache space to the UE after receiving the first request message.

Optionally, if the first request message includes the capacity of the to-be-allocated data cache space requested by the UE, the NW determines, based on the capacity of the data cache space requested in the first request message, to allocate the data cache space with a corresponding capacity to the UE. For example, if the capacity of the data cache space in the first request message is 2G; the NW allocates 2G data cache space to the UE as much as possible. Certainly, if the first request message does not include the capacity of the to-be-allocated data cache space requested by the UE, the NW may determine, based on a preset capacity or a service type of the UE, the data cache space allocated to the UE. The service type of the UE includes a video service, a data service, a voice service, and the like.

Further, after determining the data cache space allocated to the UE, the NW sends a first response message to the UE. The first response message is used to notify the UE that the data cache space has been allocated. Optionally, the first response message includes the capacity of the data cache space allocated by the NW to the UE.

S103. The UE sends a third request message to an SV.

Specifically, the UE sends the third request message to the SV, and the SV receives the third request message. The third request message is used to request the SV to send a data packet. Optionally, the third request message is a data packet request message of a hypertext transfer protocol (HTTP) type or an hypertext transfer protocol secure (HTTPS) type.

S104. The SV sends a data packet to the UE by using the NW based on the third request message.

Specifically, the SV sends the data packet to the UE after receiving the third request message. In a specific implementation process, the SV first sends the data packet to the NW, so that the NW forwards the data packet to the UE.

S105. The NW caches, in the data cache space, at least a part of the data packet sent by the SV to the UE.

Specifically, the NW receives the data packet sent by the SV to the UE and caches at least a part of the data packet in the data cache space. In a specific implementation process, the NW may determine the cached data packet based on the capacity of the data cache space allocated to the UE, and cache the determined data packet in the data cache space. Optionally, the NW caches all data packets, waits for a request of the UE, and then sends the cached data packets to the UE; or the NW selectively caches a part of the data packet, to avoid delaying data packet delivering and affecting UE service experience. For example, it is assumed that the capacity of the data cache space allocated by the NW to the UE is 500 M. If receiving a plurality of data packets whose total size is 300 M, the NW caches all the data packets in the data cache space. If receiving a plurality of data packets whose total size is 800 M, the NW caches a 500 M (or approximately 500 M) part of the data packets in the data cache space, and directly sends the remaining part of data packets to the UE. In addition, the NW may further determine the cached data packet based on a type of the data packet, and then cache the determined data packet in the data cache space. For example, if the NW receives two types of data packets: video data, and instant message data, the NW may cache the video data in the data cache space and directly send the instant message data to the UE.

Optionally, if the first request message includes the data packet identification information, the received data packet is cached in the data cache space when identification information included in the data packet received by the NW is the same as the data packet identification information included in the first request message. Correspondingly, the data packet is directly sent to the UE when the identification information included in the data packet received by the NW is different from the data packet identification information included in the first request message.

It should be noted that if data packet transmission is performed in a TCP manner at a transport layer between the UE and the SV, this embodiment of the present disclosure further includes the following: The NW notifies a TCP layer of the SV that the NW caches the service data packet sent by the SV to the UE; or the NW sends a notification message to the TCP layer of the SV each time the NW caches the received data packet. The notification message is used to enable the TCP layer of the SV to learn that the NW caches the data packet. This is because, as stipulated in TCP, the UE needs to send a feedback message to the TCP layer of the SV after the SV sends the data packet to the UE by using the NW, so that the TCP layer learns that the data packet is successfully sent. Otherwise, the TCP layer reduces a size of a sending window and/or repeatedly sends the data packet to the UE until the feedback message is received. It can be learned that in this embodiment of the present disclosure, a problem can be avoided that throughput of the TCP layer is affected and/or the data packet is repeatedly sent because the TCP layer does not receive the feedback message sent by the UE after the NW caches the received data packet.

S106. The UE sends a second request message to the NW.

Specifically, the UE sends the second request message to the NW, and the NW receives the second request message. The second request message is used to request the NW to send the data packet in the data cache space. In this embodiment of the present disclosure, the second request message may be radio resource control (RRC) message, a layer 2 control information element, or an HTTP request.

Optionally, the second request message includes at least one of the following information: (1) size information of the data packet requested by the UE; (2) identification information of the data packet requested by the UE; or (3) a storage location of the data packet requested by the UE. In case (2), an identifier of the data packet may be a sequence number of the data packet, used by the UE and the NW to uniquely identify a data packet in first cache space.

In an optional implementation, the second request message sent by the UE to the NW and a third request message sent to the SV again may be placed in one message. The third request message sent to the SV again is used to request the SV to send a new data packet. Optionally, the second request message is carried in a protocol layer header of a transport layer or an IP layer or an access layer of the third request message. For example, when the UE sends a third request message to the SV to request the SV to send an $N^{th}$ data packet, the UE adds, to the third request message, a second request message that requests, from the NW, an (N−1)th data packet cached in the data cache space, where N is a positive integer greater than 1. An advantage of this implementation is that a quantity of times of sending a request message by the UE is reduced, and an interactive process is simplified.

Figure 10:
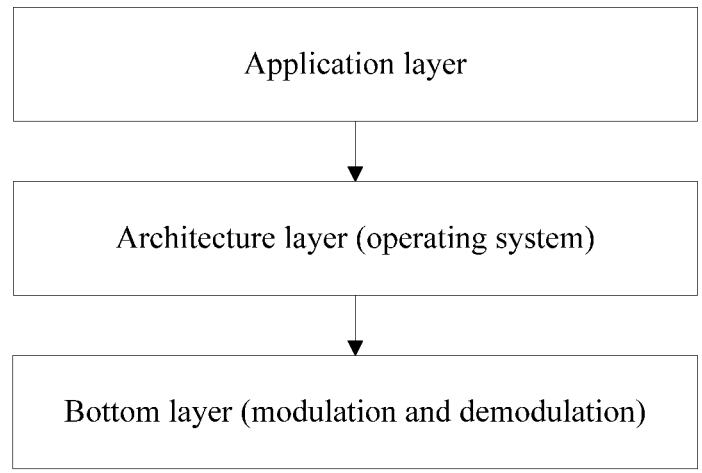
FIG. 10 is a schematic diagram of a layer structure of a terminal according to an embodiment of the present disclosure.

It should be noted that, referring to a layer structure of UE shown in FIG. 10, the second request message sent by the UE to the NW may be triggered after an application layer or an operating system of the UE sends an indication message to a bottom layer, or may be triggered when the application layer of the UE directly sends the data packet of the third request message. A header of the data packet includes indication information that instructs the bottom layer to trigger the second request message. For example, a TCP or IP header of the data packet includes the indication information. Specifically, the indication information may also be identification information of the NW, for example, an IP address of the NW.

S107. The NW sends a part or all of the cached data packet to the UE based on the second request message.

Specifically, after receiving the second request message, the NW sends, to the UE, a part or all of the data packet cached in the data cache space.

Optionally, (1) if the second request message includes the size information of the data packet requested by the UE, the NW sends a data packet corresponding to the size information to the UE in a time sequence of the cached data packet and according to a first in first out principle. For example, if the size information of the data packet included in the second request message is 200 M, the NW sends the first cached data packet whose total size is 200 M to the UE. If the total size of the cached data packet is less than 200 M, all the data packets are sent to the UE. (2) If the second request message includes the identification information of the data packet requested by the UE, the NW sends a data packet corresponding to the identification information to the UE. (3) If the second request message includes the storage location of the data packet requested by the UE, the NW sends a data packet corresponding to the storage location to the UE.

In an optional implementation, if the second request message sent by the UE to the NW and the third request message sent to the SV again are placed in one message, the NW parses out the second request message from the message, and sends a part or all of the data packet to the UE based on the second request message.

In another optional implementation, in step S106, the UE may not send the second request message to the NW. When the UE sends the third request message to the SV again, the NW determines, based on the message, whether to send a part or all of the data packet to the UE. In this implementation, the NW needs to identify the third request message. Further, the NW may directly send the third request message to the SV, and the UE does not need to send the third request message.

It can be learned from above that in this embodiment of the present disclosure, the UE requests the data cache space from the NW by sending the first request message; the NW caches, in the data cache space, at least a part of the data packet sent by the SV to the UE; the UE requests the cached data packet from the NW by sending the second request message; and the NW sends a part or all of the cached data packet to the UE. Therefore, the NW can cache the data packet for the UE based on the request of the UE, so as to resolve a problem that data packet transmission in a data transmission process is not timely.

Figure 4:
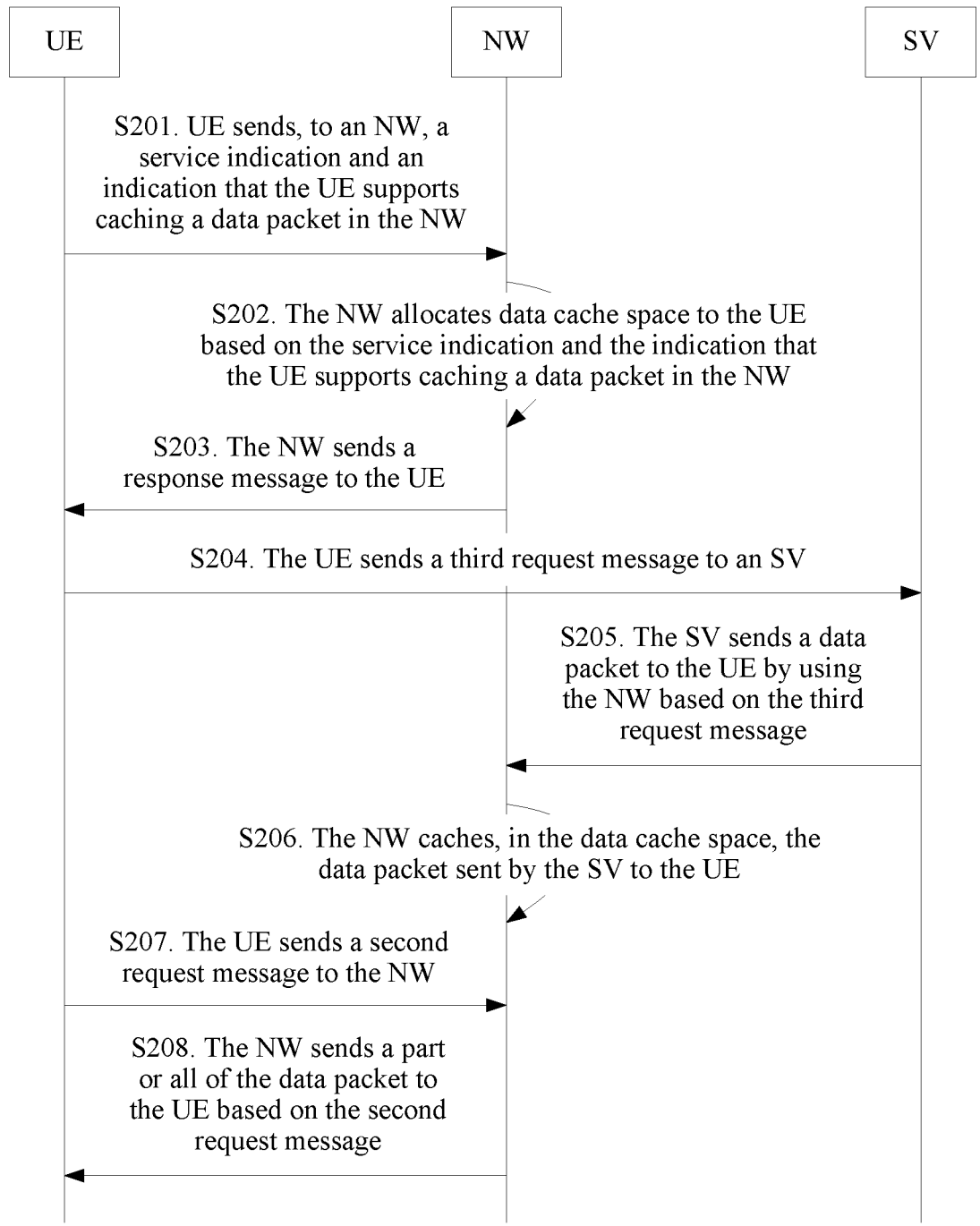
FIG. 4 is a schematic flowchart of another data packet transmission method according to an embodiment of the present disclosure.

FIG. 4 is a schematic flowchart of another data packet transmission method according to an embodiment of the present disclosure. As shown in FIG. 4, a process of the data packet transmission method in this embodiment may be described as follows:

S201. UE sends, to an NW, a service indication and an indication that the UE supports caching a data packet in the NW.

The service indication is used to indicate, to the NW, a service that needs to be transmitted, such as a video data service or a voice data service. In addition, the indication that the UE supports caching a data packet in the NW is used to indicate a capability of the UE to the NW, to be specific, the UE can support the NW in caching the data packet. It should be noted that the service indication and the indication of supporting caching the data packet in the NW that are sent by the UE may not be sent in a same message. For example, the UE may send, when accessing a network, the indication of supporting caching the data packet in the NW, and the UE sends the service indication when a service starts. It can be learned that step 201 does not limit a sequence in which the UE sends the foregoing information. It should be noted that, the UE reports the service indication for all transmitted services, but not all the services need to be cached in the data cache space, in other words, only some services need to be cached in the data cache space, or only some services can be cached in the data cache space.

Optionally, a trigger occasion when the UE sends, to the NW, the service indication and the indication that the UE supports caching a data packet in the NW may be determined based on factors such as network load, channel quality, a current data processing rate, total data that needs to be processed, and a local remaining cache space size. For example, if the UE is playing a video and detects that network load is relatively heavy and channel quality is relatively poor, the UE may predict that video freeze may occur during video play, and send, to the NW, the service indication and the indication that the UE supports caching a data packet in the NW.

Optionally, the service indication may include data packet identification information, and the data packet identification information is used to identify a to-be-cached data packet requested by the UE.

S202. The NW allocates data cache space to the UE based on the service indication and the indication that the UE supports caching a data packet in the NW.

Specifically, when receiving the service indication, the NW determines whether the indication that the UE supports caching a data packet in the NW is received. If the indication that the UE supports caching a data packet in the NW is received, the data cache space may be allocated to the UE; if the indication that the UE supports caching a data packet in the NW is not received, no data cache space is allocated to the UE.

Optionally, a specific operation that the NW allocates data cache space to the UE is: determining, based on the service indication, a service type that needs to be transmitted by the UE, and determining, based on the service type, the data cache space allocated to the UE. The service type of the UE includes a video service, a data service, a voice service, and the like. For example, when determining that the UE needs to transmit a high-definition video service, the NW allocates data cache space whose capacity is 2G to the UE. When determining that UE needs to transmit a standard-definition video service, the NW allocates data cache space whose capacity is 200 M to the UE. It should be noted that the data cache space allocated by the NW may be space with a variable size, and a specific space size varies based on an encoding manner or a fragment size of the service data packet.

S203. The NW sends a first response message to the UE.

Specifically, the NW sends the first response message to the UE, and the UE receives the first response message. The first response message is used to notify the UE of the allocated data cache space. This step is an optional step.

Optionally, the first response message includes a capacity of the data cache space allocated by the NW to the UE.

It should be noted that steps S204 to S208 in this embodiment of the present disclosure are basically the same as steps S103 to S107 in the embodiment described in FIG. 3. A difference lies in that the information included in the first request message is included in the service indication (for example, the first request message in step S105 may include the data packet identification information, and correspondingly, the service indication in step S206 may include the data packet identification information). Details are not described herein again.

It can be learned from above that in this embodiment of the present disclosure, the UE requests the data cache space from the NW by sending the service indication and the indication that the UE supports caching a data packet in the NW; the NW caches, in the data cache space, at least a part of the data packet sent by the SV to the UE; the UE requests the cached data packet from the NW by sending the second request message; and the NW sends a part or all of the cached data packet to the UE. Therefore, the NW can cache the data packet for the UE based on the request of the UE, so as to resolve a problem that data packet transmission in a data transmission process is not timely. It should be noted that, in this embodiment of the present disclosure compared with the embodiment described in FIG. 3, the UE does not need to particularly send the first request message that is used to request the NW to allocate the data cache space, and only needs to send the service indication and the indication that the UE supports caching a data packet in the NW, so that an interactive process is simplified.

In addition, it should be further noted that in the embodiments described in FIG. 3 and FIG. 4, steps S101 to S102 and steps S201 to S203 are processes in which the UE and the NW negotiate the data cache space and allocate the data cache space, and these processes and subsequent data request and receiving processes are not always sequentially performed, to be specific, in a data transmission process of the UE, steps S101 to S102 and steps S201 to S203 are optional processes. After S101 to S102 are performed once for determining the data cache space, steps S103 to S107 may be cyclically performed until data packet transmission stops or data packet transmission ends. In another feasible implementation, the NW and the UE do not need to exchange data cache space allocation, the data cache space is predefined without the need of explicit negotiation.

Figure 5:
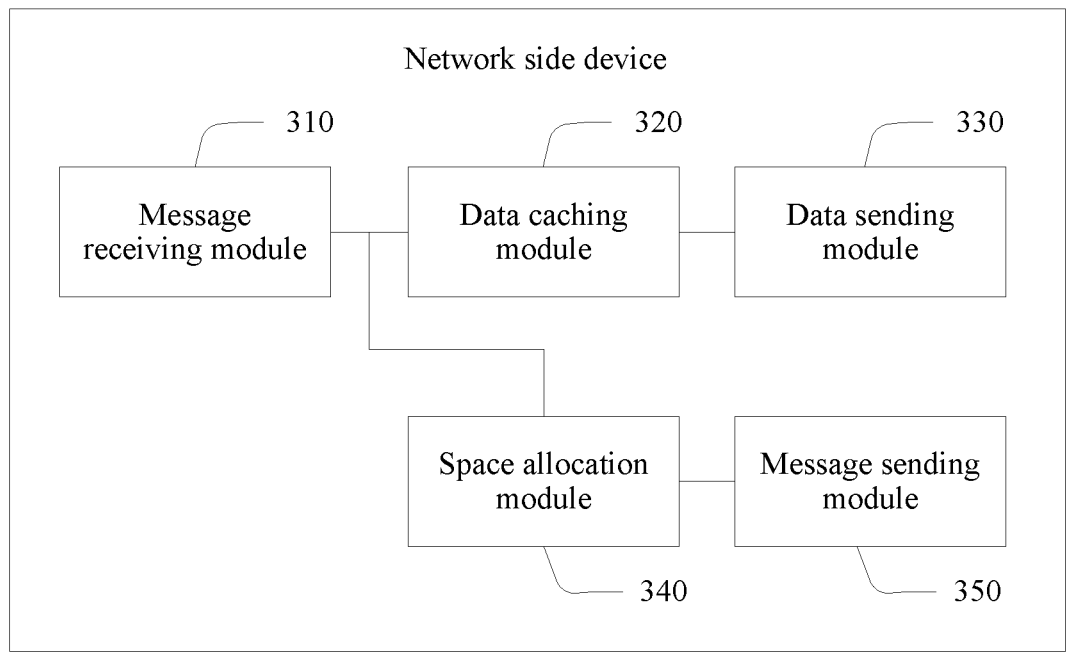
FIG. 5 is a schematic structural diagram of a network device according to an embodiment of the present disclosure.

FIG. 5 is a schematic structural diagram of a network device according to an embodiment of the present disclosure. The NW is configured to implement the NW in the embodiment described in FIG. 3 or FIG. 4. As shown in FIG. 5, the NW in this embodiment of the present disclosure may include at least a message receiving module 310, a data caching module 320, and a data sending module 330.

The message receiving module 310 is configured to receive a first request message sent by user equipment. The first request message is used to request the network device to allocate data cache space.

Specifically, the UE sends the first request message to the NW, and the message receiving module 310 receives the first request message. The first request message is used to request the NW to allocate the data cache space. It should be noted that a trigger occasion when the UE sends the first request message to the NW may be determined based on factors such as a service type of the UE, network load, channel quality, a current data processing rate, total data that needs to be processed, and a local remaining cache space size.

The data caching module 320 is configured to cache, in the data cache space, at least a part of a data packet sent by a server device to the user equipment.

Specifically, the data caching module 320 receives the data packet sent by the SV to the UE and caches at least a part of the data packet in the data cache space. In a specific implementation process, the data caching module 320 may determine the cached data packet based on a capacity of the data cache space allocated to the UE, and cache the determined data packet in the data cache space. In addition, the data caching module 320 may further determine the cached data packet based on a type of the data packet, and then cache the determined data packet in the data cache space. Optionally, the data caching module 320 caches all data packets, waits for a request of the UE, and then sends the cached data packets to the UE; or the data caching module 320 selectively caches the data packet, to avoid delaying data packet delivering and affecting UE service experience.

The message receiving module 310 is further configured to receive a second request message sent by the user equipment. The second request message is used to request the network device to send the cached data packet.

Specifically, the UE sends the second request message to the NW, and the message receiving module 310 receives the second request message. The second request message is used to request the NW to send the cached data packet.

Optionally, the second request message may be an RRC message, a layer 2 control information element, or an HTTP request.

Optionally, the second request message includes at least one of the following information: (1) size information of the data packet requested by the UE; (2) identification information of the data packet requested by the UE; or (3) a storage location of the data packet requested by the UE.

The data sending module 330 is configured to send a part or all of the data packet to the user equipment.

Specifically, the data sending module 330 sends a part or all of the cached data packet to the UE after receiving the second request message.

Optionally, the first request message sent by the user equipment includes a capacity of the data cache space requested by the user equipment. Correspondingly, referring to FIG. 5, the network device in this embodiment of the present disclosure may further include a space allocation module 340, configured to determine, based on the capacity of the data cache space requested by the first request message, to allocate the data cache space with a corresponding capacity to the user equipment.

Figure 6:
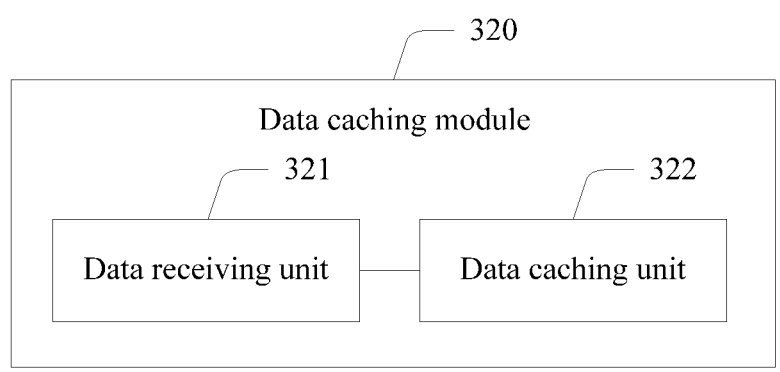
FIG. 6 is a schematic structural diagram of a data caching module according to an embodiment of the present disclosure.

Further, optionally, the first request message sent by the user equipment further includes data packet identification information, and the data packet identification information is used to identify the to-be-cached data packet requested by the user equipment. In a specific implementation process, as shown in FIG. 6, the data caching module 320 in this embodiment of the present disclosure may further include:

a data receiving unit 321, configured to receive the data packet sent by the server device to the user equipment; and a data caching unit 322, configured to cache the data packet in the data cache space if identification information included in the received data packet is the same as the data packet identification information included in the first request message.

Optionally, the first request message sent by the user equipment includes a service indication and an indication that the user equipment supports caching a data packet on the network device. Correspondingly, referring to FIG. 5, the network device in this embodiment of the present disclosure may further include a space allocation module 340, configured to allocate the data cache space to the user equipment based on the service indication and the indication that the user equipment supports caching a data packet on the network device.

Further, referring to FIG. 5, the network device in this embodiment of the present disclosure may further include a message sending module 350, configured to send a first response message to the user equipment. The first response message is used to notify that the network device has allocated the data cache space.

Further, optionally, the service indication further includes data packet identification information, and the data packet identification information is used to identify the to-be-cached data packet requested by the user equipment. In a specific implementation process, as shown in FIG. 6, the data caching module 320 in this embodiment of the present disclosure may further include:

a data receiving unit 321, configured to receive the data packet sent by the server device to the user equipment; and a data caching unit 322, configured to cache the data packet if identification information included in the received data packet is the same as the data packet identification information included in the service indication.

Figure 7:
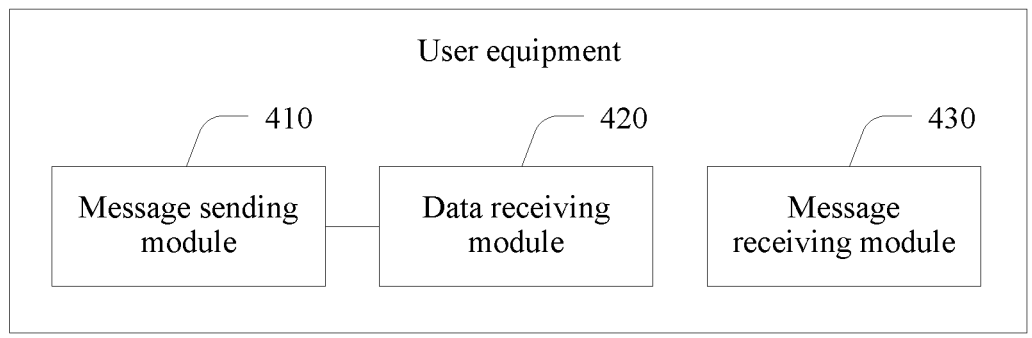
FIG. 7 is a schematic structural diagram of user equipment according to an embodiment of the present disclosure.

FIG. 7 is a schematic structural diagram of user equipment according to an embodiment of the present disclosure. The UE is configured to implement the UE in the embodiment described in FIG. 3 or FIG. 4. As shown in FIG. 7, the UE in this embodiment of the present disclosure may include at least a message sending module 410 and a data receiving module 420.

The message sending module 410 is configured to send a first request message to a network device. The first request message is used to request data cache space from the network device.

Specifically, the message sending module 410 sends the first request message to the NW, and the NW receives the first request message. The first request message is used to request the NW to allocate the data cache space. Correspondingly, the NW allocates the data cache space to the UE after receiving the first request message.

The message sending module 410 is further configured to send a third request message to a server device. The third request message is used to request the server device to send a data packet, and the network device caches, in the data cache space, at least a part of the data packet sent by the server device.

Specifically, the message sending module 410 sends the third request message to the SV, and the SV receives the third request message. Correspondingly, the SV sends the data packet to the UE after receiving the third request message. In a specific implementation process, the SV first sends the data packet to the NW, so that the NW forwards the data packet to the UE.

The message sending module 410 is further configured to send a second request message to the network device. The second request message is used to request the network device to send the cached data packet.

Specifically, the message sending module 410 sends the second request message to the NW, and the NW receives the second request message. The second request message is used to request the NW to send the cached data packet. Correspondingly, the NW sends a part or all of the data packet to the UE after receiving the second request message.

The data receiving module 420 is configured to receive a part or all of the cached data packet sent by the network device.

Optionally, referring to FIG. 7, the user equipment in this embodiment of the present disclosure may further include a message receiving module 430, configured to receive a first response message sent by the network device. The first response message is used to notify that the network device has allocated the data cache space.

Correspondingly, after determining the data cache space allocated to the UE, the NW sends the first response message to the UE. The first response message is used to notify the UE that the data cache space has been allocated. Optionally, the first response message includes a capacity of the data cache space allocated by the NW to the UE. Specifically, the message receiving module 430 receives the first response message sent by the NW.

Figure 8:
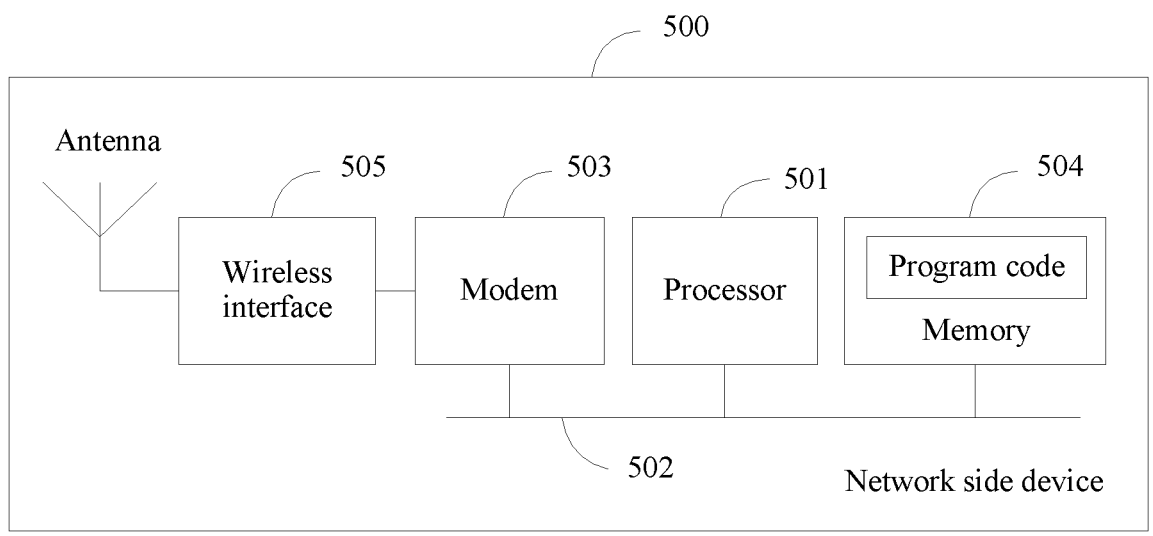
FIG. 8 is a schematic structural diagram of another network device according to an embodiment of the present disclosure.

FIG. 8 is a schematic structural diagram of another network device according to an embodiment of the present disclosure. As shown in FIG. 8, the network device may include at least one processor 501 such as a CPU, at least one communications bus 502, at least one modem 503, a memory 504, and a wireless interface 505. The communications bus 502 is configured to implement connection and communication between these components. The wireless interface 505 is configured to perform signaling or data communication with another node device. The memory 504 may be a high-speed RAM memory, or may be a non-volatile memory, for example, at least one disk memory. Alternatively, the memory 504 may be at least one storage apparatus far away from the processor 501. The memory 504 stores a group of program code, and the processor 501 is configured to invoke the program code stored in the memory 504 to perform the following operations:

receiving a first request message sent by user equipment, where the first request message is used to request the network device to allocate data cache space;

caching, in the data cache space, at least a part of a data packet sent by a server device to the user equipment;

receiving a second request message sent by the user equipment, where the second request message is used to request the network device to send the cached data packet; and sending a part or all of the cached data packet to the user equipment.

Optionally, the first request message sent by the user equipment includes a capacity of the data cache space requested by the user equipment. Correspondingly, after receiving the first request message sent by the user equipment, the processor 501 further performs the following operation:

determining, based on the capacity of the data cache space requested by the first request message, to allocate the data cache space with a corresponding capacity to the user equipment.

Further, optionally, the first request message sent by the user equipment further includes data packet identification information, and the data packet identification information is used to identify the to-be-cached data packet requested by the user equipment. Correspondingly, a specific operation that the processor 501 caches, in the data cache space, at least a part of the data packet sent by the server device to the user equipment is:

receiving the data packet sent by the server device to the user equipment; and caching the data packet in the data cache space if identification information included in the received data packet is the same as the data packet identification information included in the first request message.

Optionally, the first request message sent by the user equipment includes a service indication and an indication that the user equipment supports caching a data packet on the network device. Correspondingly, after receiving the first request message sent by the user equipment, the processor 501 further performs the following operation:

allocating the data cache space to the user equipment based on the service indication and the indication that the user equipment supports caching a data packet on the network device.

Further, after allocating the data cache space to the user equipment based on the service indication and the indication that the user equipment supports caching a data packet on the network device, the processor 501 further performs the following operation:

sending a first response message to the user equipment, where the first response message is used to notify that the network device has allocated the data cache space.

Further, optionally, the service indication further includes data packet identification information, and the data packet identification information is used to identify the to-be-cached data packet requested by the user equipment. Correspondingly, a specific operation that the processor 501 caches, in the data cache space, at least a part of the data packet sent by the server device to the user equipment is:

receiving the data packet sent by the server device to the user equipment; and caching the data packet if identification information included in the received data packet is the same as the data packet identification information included in the service indication.

Optionally, the second request message includes at least one of the following information:

size information of the data packet requested by the user equipment;

identification information of the data packet requested by the user equipment; or a storage location of the data packet requested by the user equipment.

Optionally, the second request message is a radio resource control (RRC) message or a hypertext transfer protocol (HTTP) request.

Figure 9:
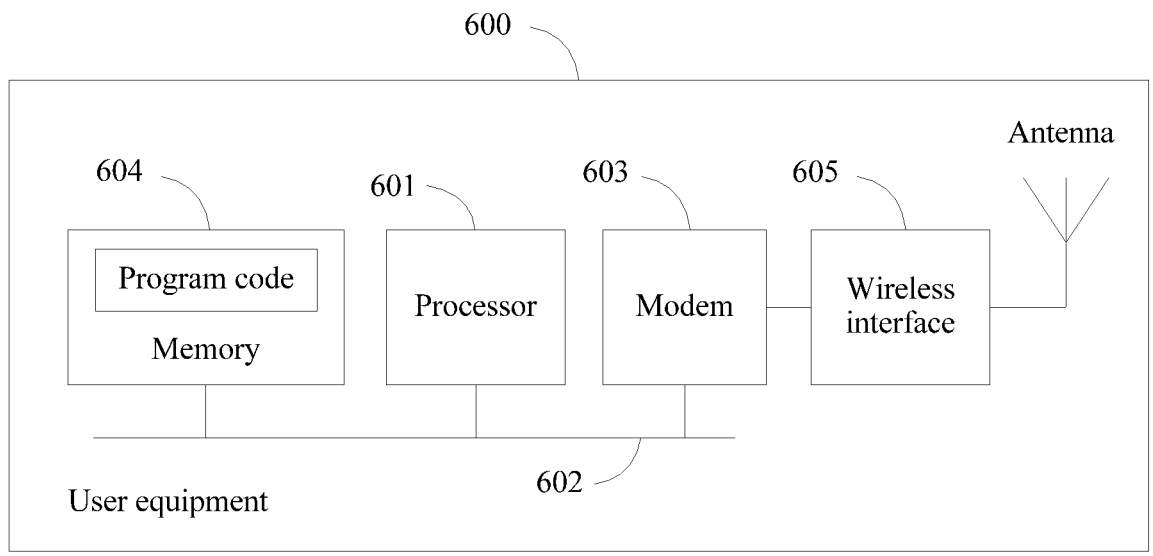
FIG. 9 is a schematic structural diagram of another user equipment according to an embodiment of the present disclosure.

FIG. 9 is a schematic structural diagram of another user equipment according to an embodiment of the present disclosure. As shown in FIG. 9, the user equipment may include at least one processor 601 such as a CPU, at least one communications bus 602, at least one modem 603, a memory 604, and a wireless interface 605. The communications bus 602 is configured to implement connection and communication between these components. The wireless interface 605 is configured to perform signaling or data communication with another node device. The memory 604 may be a high-speed RAM memory, or may be a non-volatile memory, for example, at least one disk memory. Alternatively, the memory 604 may be at least one storage apparatus far away from the processor 601. The memory 604 stores a group of program code, and the processor 601 is configured to invoke the program code stored in the memory 604 to perform the following operations:

sending a first request message to a network device, where the first request message is used to request data cache space from the network device;

sending a third request message to a server device, where the third request message is used to request the server device to send a data packet, and the network device caches, in the data cache space, at least a part of the data packet sent by the server device;

sending a second request message to the network device, where the second request message is used to request the network device to send the cached data packet; and receiving a part or all of the cached data packet sent by the network device.

Optionally, the first request message includes a capacity of the data cache space requested by the user equipment.

Further, optionally, the first request message further includes data packet identification information, and the data packet identification information is used to identify the to-be-cached data packet requested by the user equipment.

Optionally, the first request message includes a service indication and an indication that the user equipment supports caching a data packet on the network device.

Further, after sending the first request message to the network device, the processor 601 further performs the following operation:

receiving a first response message sent by the network device, where the first response message is used to notify that the network device has allocated the data cache space.

Further, optionally, the service indication further includes data packet identification information, and the data packet identification information is used to identify the to-be-cached data packet requested by the user equipment.

Optionally, the second request message includes at least one of the following information:

size information of the data packet requested by the user equipment;

identification information of the data packet requested by the user equipment; or a storage location of the data packet requested by the user equipment.

Optionally, the second request message is a radio resource control (RRC) message or a hypertext transfer protocol (HTTP) request.

An embodiment of the present disclosure further proposes a computer storage medium. The computer storage medium stores a program, and the program includes several instructions that are used to perform some or all steps in the data packet transmission method described in FIG. 3 to FIG. 4 in the embodiments of the present disclosure.

An embodiment of the present disclosure further provides a communications system, which may include the NW described in FIG. 5 and the UE and the SV described in FIG. 7.

The NW is configured to: receive a first request message sent by the UE, where the first request message is used to request the NW to allocate data cache space; cache, in the data cache space, at least a part of a data packet sent by the SV to the UE; receive a second request message sent by the UE, where the second request message is used to request the NW to send the cached data packet; and send a part or all of the cached data packets to the UE.

The UE is configured to: send the first request message to the NW, where the first request message is used to request the data cache space from the NW; send a third request message to the SV, where the third request message is used to request the SV to send the data packet, and the NW caches, in the data cache space, at least a part of the data packet sent by the SV; send the second request message to the NW, where the second request message is used to request the NW to send the cached data packet; and receive a part or all of the cached data packet sent by the NW.

It can be learned from above that in the embodiments of the present disclosure, the user equipment requests the data cache space from the network device by sending the first request message; the network device caches, in the data cache space, at least a part of the data packet sent by the server device to the user equipment; the user equipment requests the cached data packet from the network device by sending the second request message; and the network device sends a part or all of the cached data packet to the user equipment. Therefore, the network device can cache the data packet for the user equipment based on the request of the user equipment, so as to resolve a problem that data packet transmission in a data transmission process is not timely.

A person of ordinary skill in the art may understand that all or some of the processes of the methods in the embodiments may be implemented by a computer program instructing related hardware. The program may be stored in a computer readable storage medium. When the program runs, the processes of the methods in the embodiments are performed. The foregoing storage medium may include: a magnetic disk, an optical disc, a read-only memory (ROM), or a random access memory (RAM).

What are disclosed above are merely examples of embodiments of the present disclosure, and certainly are not intended to limit the scope of the claims of the present disclosure. Therefore, equivalent variations made in accordance with the claims of the present disclosure shall fall within the scope of the present disclosure.

What is claimed is:

1. A method of transmitting a data packet, comprising:
sending, by user equipment to a network device, a first request message to request data cache space from the network device, wherein the first request message comprises a first capacity of the data cache space requested by the user equipment;
receiving, by the user equipment from the network device, a first response message indicating a second capacity of the data cache space that has been allocated to the user equipment, the second capacity being less than the first capacity;
sending, by the user equipment to a server device, a third request message to request the server device to send a data packet, wherein the network device caches, in the data cache space, a first part of the data packet sent by the server device;
receiving, by the user equipment from the server device, a second part of the data packet sent by the server device, wherein the second part of the data packet sent by the server device is not cached by the network device;
sending, by the user equipment to the network device, a second request message to request the network device to send the cached data packet; and
receiving, by the user equipment from the network device, at least a part of the cached data packet.

2. The method according to claim 1, wherein the first request message further comprises data packet identification information used to identify the to-be-cached data packet requested by the user equipment.

3. The method according to claim 1, wherein the first request message comprises a service indication and an indication that the user equipment supports caching a data packet on the network device.

4. The method according to claim 3, wherein the service indication further comprises data packet identification information used to identify the to-be-cached data packet requested by the user equipment.

5. A network device, comprising:
a receiver configured to receive from user equipment a first request message to request the network device to allocate data cache space, wherein the first request message comprises a first capacity of the data cache space requested by the user equipment;
transmit a first response message to the user equipment indicating a second capacity of the data cache space that has been allocated to the user equipment, the second capacity being less than the first capacity;

a processor, configured to cache, in the data cache space, a first part of a data packet sent by a server device to the user equipment, wherein
the receiver is further configured to receive from the user equipment a second request message used to request the network device to send the cached data packet; and
a transmitter, configured to send to the user equipment at least a part of the cached data packet.

6. The network device according to claim 5, wherein the first request message further comprises data packet identification information used to identify the to-be-cached data packet requested by the user equipment; and
wherein
the receiver is further configured to receive the first part of the data packet sent from the server device to the user equipment; and
the processor is further configured to cache the first part of the data packet in the data cache space when identification information included in the received data packet is the same as the data packet identification information included in the first request message.

7. The network device according to claim 5, wherein the first request message comprises a service indication and an indication that the user equipment supports caching a data packet on the network device; and
the processor is further configured to allocate to the user equipment the data cache space based on the service indication and the indication that the user equipment supports caching a data packet on the network device.

8. The network device according to claim 7, wherein the service indication further comprises data packet identification information used to identify the to-be-cached data packet requested by the user equipment; and
wherein
the receiver is further configured to receive the first part of the data packet sent from the server device to the user equipment; and
the processor is further configured to cache the first part of the data packet when identification information included in the received data packet is the same as the data packet identification information included in the service indication.

9. The network device according to claim 5, wherein the second request message comprises at least one of the following information:
size information of the data packet requested by the user equipment;
identification information of the data packet requested by the user equipment; or
a storage location of the data packet requested by the user equipment.

10. User equipment, comprising:
a transmitter, configured to:
send, to a network device, a first request message to request data cache space from the network device, wherein the first request message comprises a first capacity of the data cache space requested by the user equipment;
receive, from the network device, a first response message indicating a second capacity of the data cache space that has been allocated to the user equipment, the second capacity being less than the first capacity;
send, to a server device, a third request message used to request the server device to send a data packet, wherein the network device caches, in the data cache space, a first part of the data packet sent by the server device;

receive, from the server device, a second part of the data packet sent by the server device, wherein the second part of the data packet sent by the server device is not cached by the network device:

send to the network device a second request message to request the network device to send the cached data packet; and a receiver, configured to receive from the network device at least a part of the cached data packet.

11. The user equipment according to claim 10, wherein the first request message further comprises data packet identification information used to identify the to-be-cached data packet requested by the user equipment.

12. The user equipment according to claim 10, wherein the first request message comprises a service indication and an indication that the user equipment supports caching a data packet on the network device.

13. The user equipment according to claim 12, wherein the service indication further comprises data packet identification information used to identify the to-be-cached data packet requested by the user equipment.

14. The user equipment according to claim 10, wherein the second request message comprises at least one of the following information:

size information of the data packet requested by the user equipment;

identification information of the data packet requested by the user equipment; or a storage location of the data packet requested by the user equipment.

* * * * *